H. C. CREAL.
Smelting-Furnaces.

No. 165,477.

Patented July 13, 1875.

WITNESSES:

INVENTOR:
H. C. Creal
BY
ATTORNEYS.

UNITED STATES PATENT OFFICE.

HENRY C. CREAL, OF CHEYENNE CITY, WYOMING TERRITORY.

IMPROVEMENT IN SMELTING-FURNACES.

Specification forming part of Letters Patent No. 165,477, dated July 13, 1875; application filed February 20, 1875.

*To all whom it may concern:*

Figure 1:
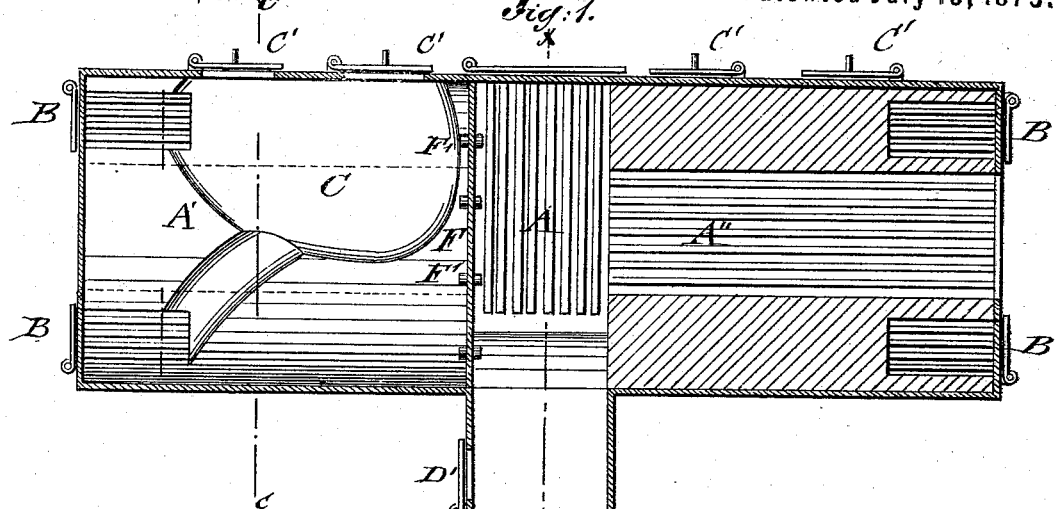
Figure 2:
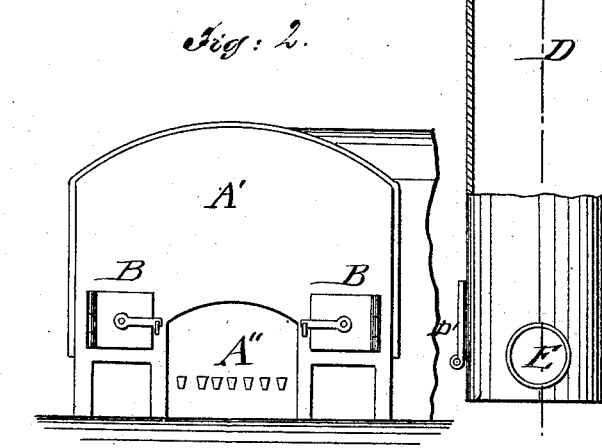
Figure 3:
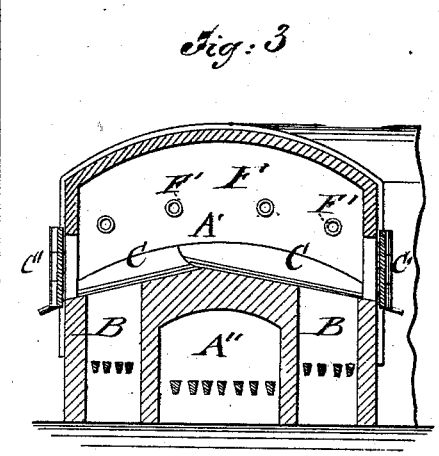
Figure 4:
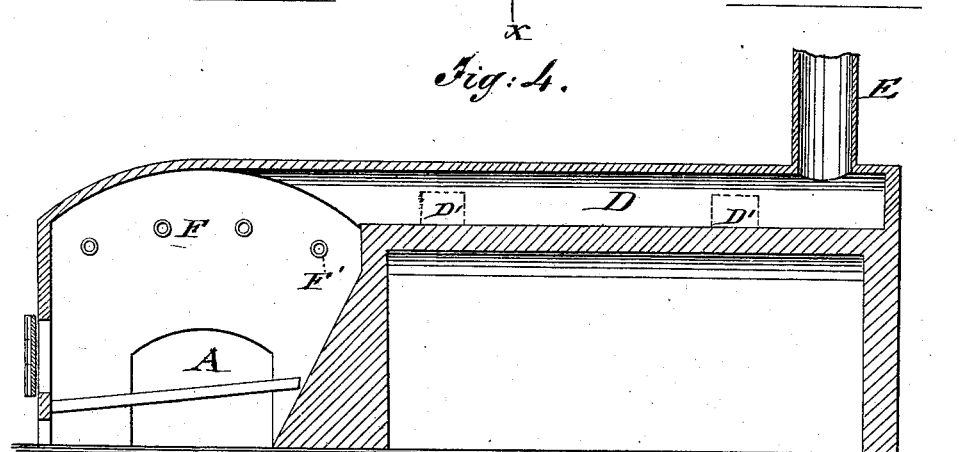

Be it known that I, HENRY C. CREAL, of Cheyenne City, in the county of Laramie and Territory of Wyoming, have invented a new and Improved Smelting-Furnace, of which the following is a specification:

In the accompanying drawing, Figure 1 represents a horizontal section of my improved smelting-furnace; Fig. 2, an end view, and Figs. 3 and 4, respectively, vertical transverse and longitudinal sections of the furnace on the line *c c* and *x x*, Fig. 1.

Similar letters of reference indicate corresponding parts.

My invention is an improved furnace for reducing silver, gold, copper, and other ores; and it consists in the construction and arrangement of parts, as hereinafter described and claimed.

A represents the main and central fire-place or furnace, and D the flue thereof, leading to the chimney E. The ore-melting furnaces A' are located one on each side of the central heating-furnace A, and communicate therewith by means of openings or tubes F' in the vertical side walls F of furnace A. The three furnaces, together with the flue D, are arranged in the form of the Latin cross. Fire-places A'' A'' are located between B B and directly under the floor C. These (A'') communicate directly with central fire-place A. The ore to be melted is placed on the concave floor C of furnaces A', and the same is melted by the heat from central furnace A, and the fire-places A'' A'' and B B of furnaces A' A'. The fire-places B B are located at the outer end of furnace A', as above indicated, one on each side of fire-place A''. The molten metal is drawn off or removed through the same door or doors C' of furnace A', by which the ore was previously inserted. In the case of lead and silver ores the spouts or stems *a* of concave floor C will be employed to draw off the molten mass. The products of combustion from furnaces A' A' pass into furnace A by means of the openings F' in its side walls F, and, mingling with the products of combustion in the latter, pass through flue D to the chimney or stack E. Fine particles of metal will be carried along by the strong heated current, and but for some means of arresting them pass up the chimney and be lost. My preferred means for this purpose are quicksilver and iodine, the latter in a solid state, which I place in suitable jars or vessels in flue D, contiguous to doors D. The fumes of these metals, quicksilver and iodine, mingle with the escaping gases and other products of combustion, and cause precipitation of the fine particles of gold or silver, and thus effect a valuable economy in the reducing process. The heat of the central furnace A is much greater than that of the reducing-furnaces A' A'.

It will be seen that the floor C of the furnaces A is heated by fire-places A'', and that the fire gases also pass over and in direct contact with the ore from the symmetrically arranged furnaces B B. The still greater heat of the central furnaces A not only aids in reduction of the ore, but creates a strong draft in the main flue, and effects the proper union of the iodine and quicksilver with the finely-divided particles of gold or silver.

Having thus described my invention, I claim as new and desire to secure by Letters Patent—

1. The combination of the lower central fire-place A and side fire-places A'' and A'', located beneath the ore-melting furnace A', all as specified.

2. The combination of the lower fire-places and flues with the furnaces above the same, being arranged symmetrically to the central fire-place, and with the separate direct acting fire-places at both ends, for accelerating the action of the furnaces, as shown and described.

3. The combination of the furnaces A', and their separate upper fire-places B, with the main flue, arranged at right angles thereto, and the partition-walls F, having openings F', as shown and described.

HENRY C. CREAL.

Witnesses:
L. D. BEARY,
L. KABIS.